United States Patent [19]
Ballard et al.

[11] Patent Number: 6,157,930
[45] Date of Patent: Dec. 5, 2000

[54] ACCELERATING ACCESS TO WIDE AREA NETWORK INFORMATION IN MODE FOR SHOWING DOCUMENT THEN VERIFYING VALIDITY

[75] Inventors: Clinton L. Ballard, Suquamish; Timothy W. Smith, Seattle, both of Wash.

[73] Assignee: Acceleration Software International Corporation, Poulsbo, Wash.

[21] Appl. No.: 09/160,446

[22] Filed: Sep. 24, 1998

[51] Int. Cl.[7] .............................. G06F 17/30; G06F 17/00
[52] U.S. Cl. .......................... 707/203; 707/501; 709/217; 709/219
[58] Field of Search ................................ 707/8, 201, 203, 707/511; 709/217, 219, 213, 216; 711/3, 113, 126, 141

[56] References Cited

U.S. PATENT DOCUMENTS

| | | | |
|---|---|---|---|
| 5,745,737 | 4/1998 | Kayes et al. | 703/13 |
| 5,842,216 | 11/1998 | Anderson et al. | 707/203 |
| 5,864,852 | 1/1999 | Luotonen | 707/10 |
| 5,873,100 | 2/1999 | Adams et al. | 707/204 |
| 6,038,601 | 3/2000 | Lambert et al. | 709/226 |

FOREIGN PATENT DOCUMENTS

| | | |
|---|---|---|
| 0 752 660 A1 | 1/1997 | European Pat. Off. . |
| 0 837 407 A1 | 4/1998 | European Pat. Off. . |
| 11-120060 | 4/1999 | Japan . |

OTHER PUBLICATIONS

Reddy, M.; Fletcher, G.P. "An Adaptive Mechanism for Web Browser Cache Management." IEEE Internet Computing, Jan.–Feb. 1998. vol. 2. No. 1. IEEE. ©1998. pp. 78–81.

Shi, Ying; Watson, Edward; Chen, Ye–sho. "Model–Driven Simulation of World–Wide–Web Cache Policies." Proceedings of the 1997 Winter Simulation Conference. ACM. ©1997. pp. 1045–1052.

Gettys, Jim. "Hypertext Transport Protocol HTTP/1.1" (presentation). Dated Oct. 17, 1996. Found at http://www.w3.org/Protocols/#Talks.

*Primary Examiner*—Joseph H. Feild
*Assistant Examiner*—Michael J. Perkins
*Attorney, Agent, or Firm*—Steven P. Koda, Esq.

[57] ABSTRACT

WAN documents are stored locally in cache with a document expiration date. Ideally, content is unchanged prior to the expiration date and has changed after the expiration date. When requesting to view a WAN document while on-line, the document first is displayed from cache for display and verify mode. The web browser then sends a request to the web server to verify whether the document has been modified. If still valid, then the document is already displayed and time has been saved. If invalid, then the document is downloaded from the web server, stored in cache, and optionally or automatically displayed in place of the invalid document. A signal is communicated to the user, for example, to give the option to reload the document. Because document expiration times may be absent or unreliable, a soft and a hard expiration time are derived and adjusted dynamically based upon their reliability.

39 Claims, 8 Drawing Sheets

FIG. 10

ACCELERATING ACCESS TO WIDE AREA NETWORK INFORMATION IN MODE FOR SHOWING DOCUMENT THEN VERIFYING VALIDITY

BACKGROUND OF THE INVENTION

This invention relates to accelerating wide area network browser operations by caching wide area network information, and more particularly to a method and apparatus for reducing average latency before displaying information from a wide area network.

Wide area networks such as the internet, and similar intranets, are being used increasingly for accessing information and for communicating among individuals and businesses. Conventionally, an end user computer accesses the wide area network by a wired or a wireless transfer medium. A user accesses the internet, for example, using a modem and the standard telephone communication network. Alternative carrier systems such as cable and satellite communication systems also are being contemplated for delivery of internet and wide area network services. The formal definition of the "Internet" is the global information system that (i) is logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available over the internet include information retrieval services, information search services, communication services, and multimedia information services. The information retrieval services include FTP and Gopher. The information search services include WAIS, Archie, and Veronica. The communication services include Email, Telnet, USENET, and IRC. The multimedia information services include the World Wide Web (WWW).

The WWW is an increasingly popular service of the internet. Documents accessed over the WWW are ASCII documents that contain commands from a language called HTML (hypertext markup language). HTML commands allow a programmer to tag passages of text. The tag is used by a web browser application at the client computer to format the text for display. Tagging allows effective text formatting (e.g., larger text for heading, bold or italic text for emphasis). HTML also allows in-line images to be included. Another feature of HTML is hypertext links. Hypertext links allow a client to load another WWW document by clicking a link area on the display screen. A document may contain links to many other related documents. The related documents may be on the same computer as the first document, or may be on a computer on the other side of the world. A link area typically includes a word, group of words, or a picture.

One of the challenges in supporting the growing number of end users and the increasing amount of information available through the internet is delivering such information content to the end user in a timely manner. Using the conventional public telephone communication system and 28.8 kbaud modems data is transferred at a rate of not more than approximately 3 kilobytes per second. For multimedia documents on the world wide web, there often is a substantial delay waiting for a document with included images to be downloaded.

For general purpose computing on a general purpose computer, a common way of improving access to data is to store data in a cache. Upon an initial request the data is accessed from the main source of such data and stored in the cache. For subsequent accesses the data then can be accessed from the cache. The cache generally has a much faster access response time than the main data source. Conventional web browser software programs typically set up a multi-megabyte cache on an end user's computer to improve access time.

The information available through the internet is dynamic, however. Information content changes. Accordingly, it is desirable to determine whether information from the cache should be used or whether the information should be re-downloaded from the internet. Conventionally, a web browser stores a document expiration time when it is downloaded. Such time is downloaded with the document from a web server computer, or is set heuristically by the web browser. If such time has not expired, then the browser displays the document from cache. No communication with the web server is needed. If such time has expired, then the browser first sends a request to the web server to determine whether the document is still valid. If valid, then the document is displayed from cache. If not valid, then the document is downloaded from the web server and displayed.

SUMMARY OF THE INVENTION

According to the invention, access to wide area network documents is accelerated using a display then verify mode for cached documents. In the display then verify mode, the cached document is displayed upon a user request, even when the document is determined to have expired. The web browser then sends a request to the web server to verify whether the document is invalid. Thus, the document first is displayed, then verified. If still valid, then the document is already displayed and time has been saved. If invalid, then the document is downloaded from the web server and stored in cache.

According to one aspect of the invention, the downloaded document during a verify operation is not automatically displayed overwriting the invalid version of the document currently being displayed. Instead, a signal is communicated to the user giving them the option to reload the document to view the valid document. For example, a beep, voice or other audio sound may be used. In another example, a message is displayed informing the user to reload the document. In still other embodiments, the user may configure or command the software to automatically update downloaded pages from each verify operation without prompting by an audio or video indication.

Because document expiration times may be absent or unreliable, according to another aspect of this invention, a first and a second expiration time are derived for each document. A last modified time is inspected for the document when it is first downloaded and stored in cache. A first expiration time, referred to herein as a soft expiration time, is estimated from such last modified time and the current time at which the document is downloaded. The soft expiration time occurs after the last modified time and after such download time. The soft expiration time indicates how long it is safe to display the document without verifying its validity. A second expiration time, referred to herein as a hard expiration time, also is estimated from the last modified time and the current time at which the document is downloaded. The soft expiration time occurs before the hard expiration time. The hard expiration time is a time for which the document is considered so likely to be stale, that it is not displayed from cache unless it is first verified to be valid by the web server.

According to another aspect of the invention, when a user requests to see a wide information network document that is stored in cache, the current time is compared to the soft expiration time and the hard expiration time. If the current time is less than the soft expiration time, then the document is displayed from cache. No verification is performed.

If the current time is between the soft expiration time and the hard expiration time, then the document is first displayed, then verified. The document is displayed from the local cache. The web browser then sends a request to the web server to verify whether the document is invalid. If still valid, then the document is already displayed and time has been saved. If invalid, then the document is downloaded from the web server, stored in cache, and optionally displayed at the user request or (automatically displayed).

If the current time is after the hard expiration time, then the web browser first sends a request to the web server to verify whether the document is invalid. The document is not yet displayed. If the response indicates that the document is valid, then the document is displayed from cache. If the response indicates that the document is invalid, then the document is downloaded from the web server, displayed and stored in cache.

Thus, display occurs without verify when neither the soft or hard expiration time has expired; display occurs before verify when the soft expiration, but not the hard expiration time has expired; and verify occurs first when both the soft expiration time and the hard expiration time has expired.

According to another aspect of the invention, the soft expiration time and hard expiration time are adjusted dynamically based upon their reliability. Because a document may include a last modified time which is inaccurate, the reliability of the last modified time is tested in some embodiments. Typically, there are many documents which together form a web site and are controlled by a common owner. When the owner changes any one of these documents, the whole group of documents often are uploaded to the web server so that all the documents for that web site have a changed last modified date. Thus, some of the last modified dates are unreliable. Accordingly, when a hard expiration date has passed and the verify operation indicates that the document has been modified, the downloaded document is compared to the cached document in a reliability test. If the document has not in fact changed, then it is treated as if the server indicated that the document had not been modified. (Thus, the earlier verify was unreliable). If the document has changed (i.e., the earlier verify was reliable), then the new last modified date is cached with the new version of the document.

When the hard expiration time has expired, and the reliability test indicates that the document has not changed (while the verify step indicated that it had changed), then the hard expiration time is changed by altering the time to move further away from the soft expiration time. Thus, some future document viewing may occur in which the cached document is displayed and verified, without first verifying its validity. Thus, the hard expiration time may change dynamically.

The soft expiration time also may be changed dynamically. When (i) the soft expiration time has expired and the hard expiration time has not expired (i.e., display, then verify mode), and (ii) the verify operation indicates that the document is still valid, then the soft expiration time is changed by moving its value closer to the hard expiration time. Thus, some future document viewing may occur in which the cached document is displayed without verifying its validity.

According to one advantage of the invention, the average latency time from the time an end user issues a command to display a specific document to the time that such document is displayed is reduced using the display then verify mode. In addition, the reliability of display then verify is increased by implementing dynamic soft and hard expiration times. These and other aspects and advantages of the invention will be better understood by reference to the following detailed description taken in conjunction with the accompanying drawings.

BRIEF DESCRIPTION OF THE DRAWINGS

FIG. 10 is a flow chart of an alternative processing branch to a decision step in the flow chart of FIG. 8.

DESCRIPTION OF SPECIFIC EMBODIMENTS

Host Network Environment

Figure 1:
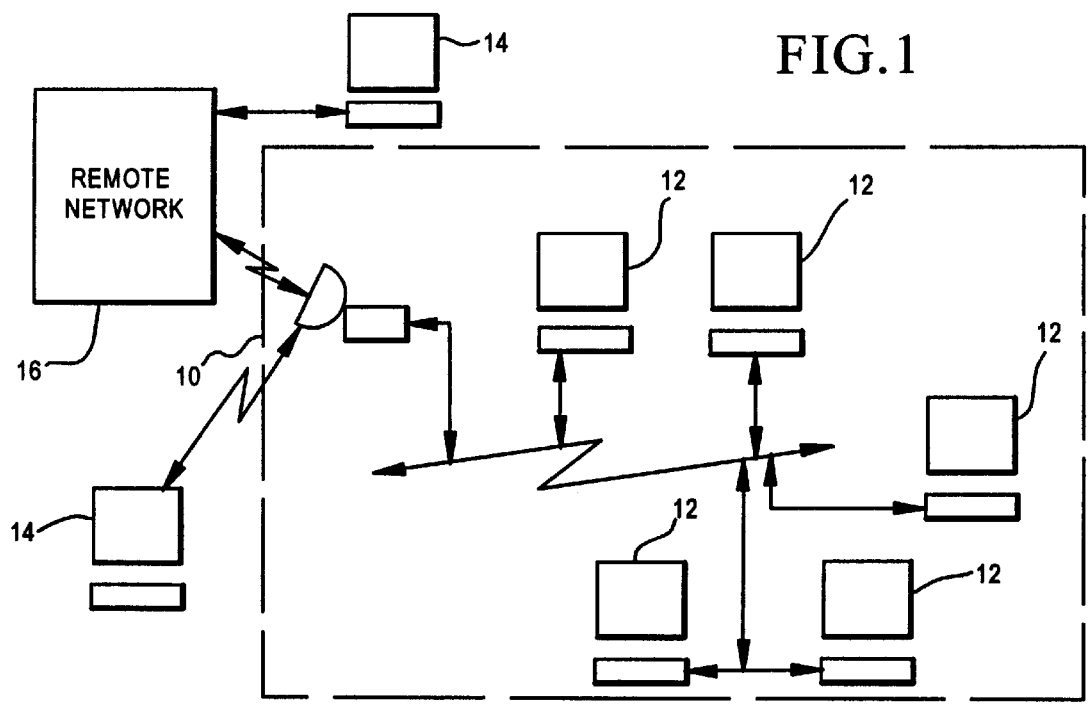
FIG. 1 is a schematic diagram of a wide area network.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network servers computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term document as used herein, includes files (as per the Windows operating system usage), documents (as per the MacOS operating system usage), pages (as per the web phraseology usage, and other records, entries or terminology used to describe a unit of a data base, a unit of a file system or a unit of another data collection type, whether or not such units are related or relational.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into The wide area network 10 using a modem and the standard telephone communication network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private, or semi-private network using proprietary communication protocols.

The client computer 14 is any end user computer, and may also be a mainframe computer, minicomputer or microcomputer having one or more microprocessors. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16.

Computer System

Figure 2:
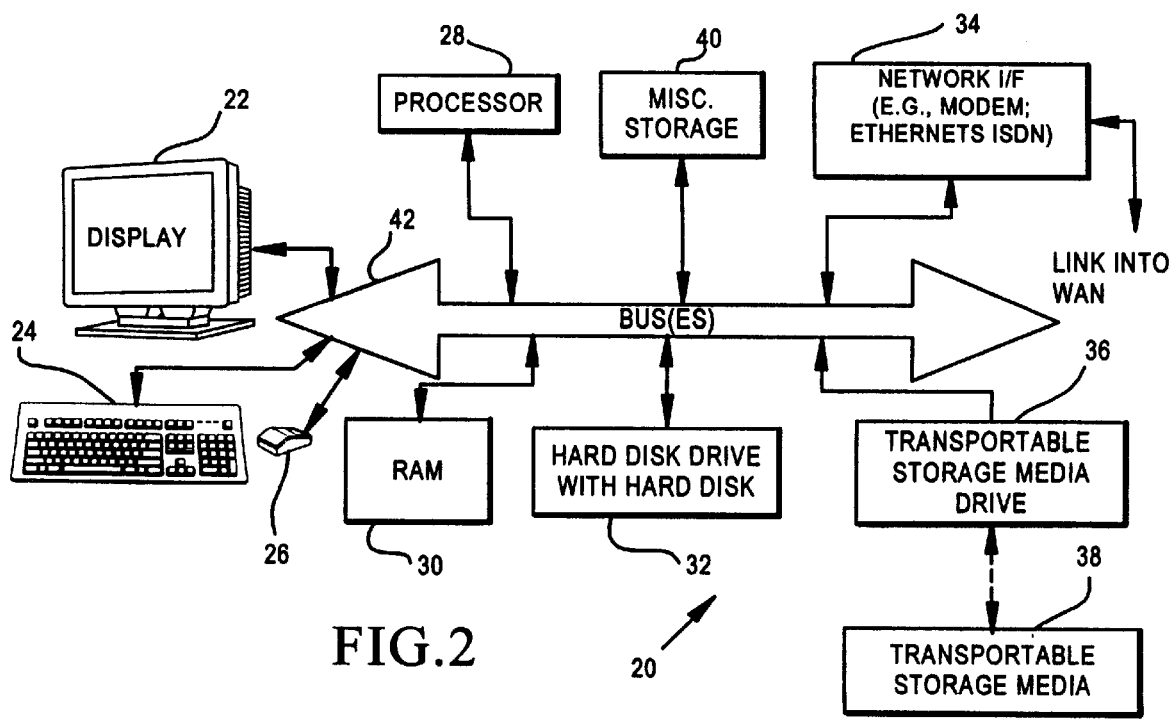
FIG. 2 is a block diagram of a computer system for a computer connected into the wide area network of FIG. 1.

The functions of the present invention preferably are performed by programmed digital computers of the type which are well known in the art, an example of which is shown in FIG. 2. A computer system 20 has a display monitor 22, a keyboard 24, a pointing/clicking device 26, a processor 28, random access memory (RAM) 30, a non-volatile storage device such as a hard disk drive 32, a communication or network interface 34 (e.g., modem; ethernet adapter), and a transportable storage media drive 36 which reads transportable storage media 38. In addition other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

Memory Space and Cache Devices for the Computer System

Figure 3:
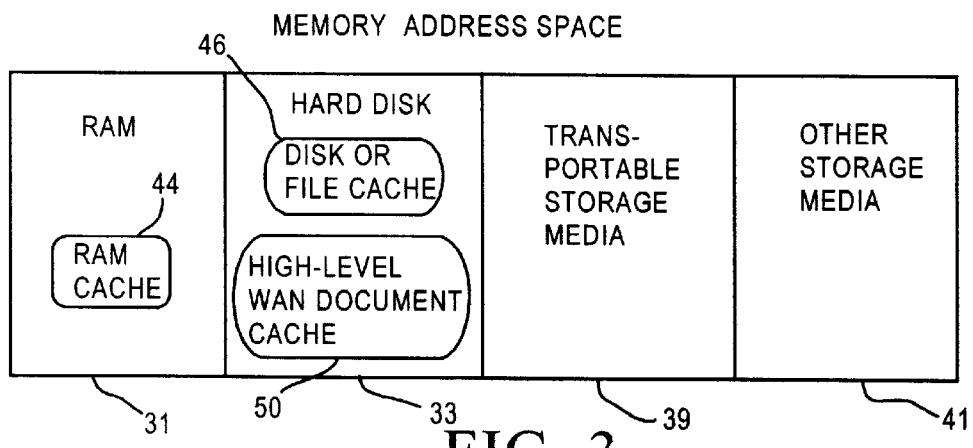
FIG. 3 is a diagram of memory address space for the computer system of FIG. 2.

FIG. 3 shows a memory address space for the computer system 20 of FIG. 2. The computer system 20 includes several memory storage devices 30, 32, 36, 40, and thus has an address space encompassing the capacity of such devices.

There is a RAM address space 31 for the random access memory 30, a hard disk address space 33 for the hard disk drive 32, a transportable media address space 39 for the transportable media drive 36, and other storage media address space 41 for the other storage media 40. Such address spaces may be implemented as physical address space and expanded to include virtual address space.

Typically the computer system 20 will use some of the address space to implement one or more cache devices. A cache is a special memory subsystem into which frequently used data is copied and stored for quick access. When data is requested, the cache is checked first to see if the data is present. If present and valid, then the data is retrieved from the more quickly accessed cache, instead of the more slowly accessed owner storage media. Conventional computer systems often include cache memory on the microprocessor chip and in RAM. In addition, it is known to include a disk-based cache or a file-based cache on a hard disk.

FIG. 3 shows a portion of random access memory allocated to serve as a RAM cache 44 and a portion of the hard disk address space (e.g., physical address space or virtual address space) to serve as a disk cache or a file cache 46. In one implementation the RAM cache 44 is a primary cache, and the disk or file cache 46 is a secondary cache. In some embodiments there are one or more disk or file caches 46. In one embodiment there is a disk or file cache which is dedicated to serve as a high-level cache 50 for wide area network data. As described below the high-level cache 50 is used for storing documents located elsewhere in the wide area network 10.

Figure 4:
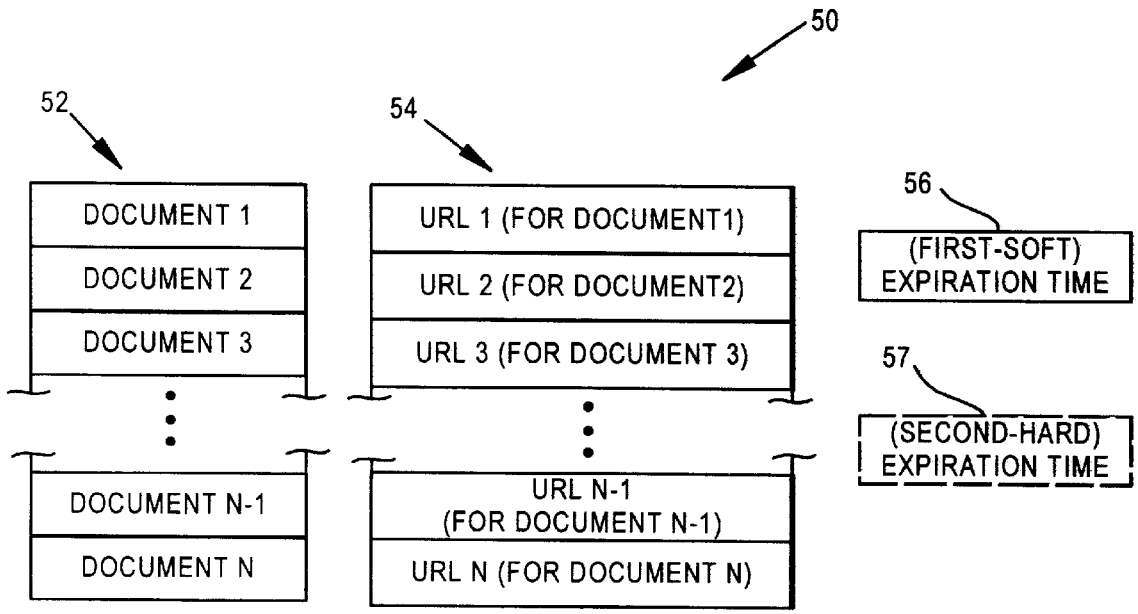
FIG. 4 is a diagram of the functional content of the document cache according to an embodiment of this invention.
Figure 5:
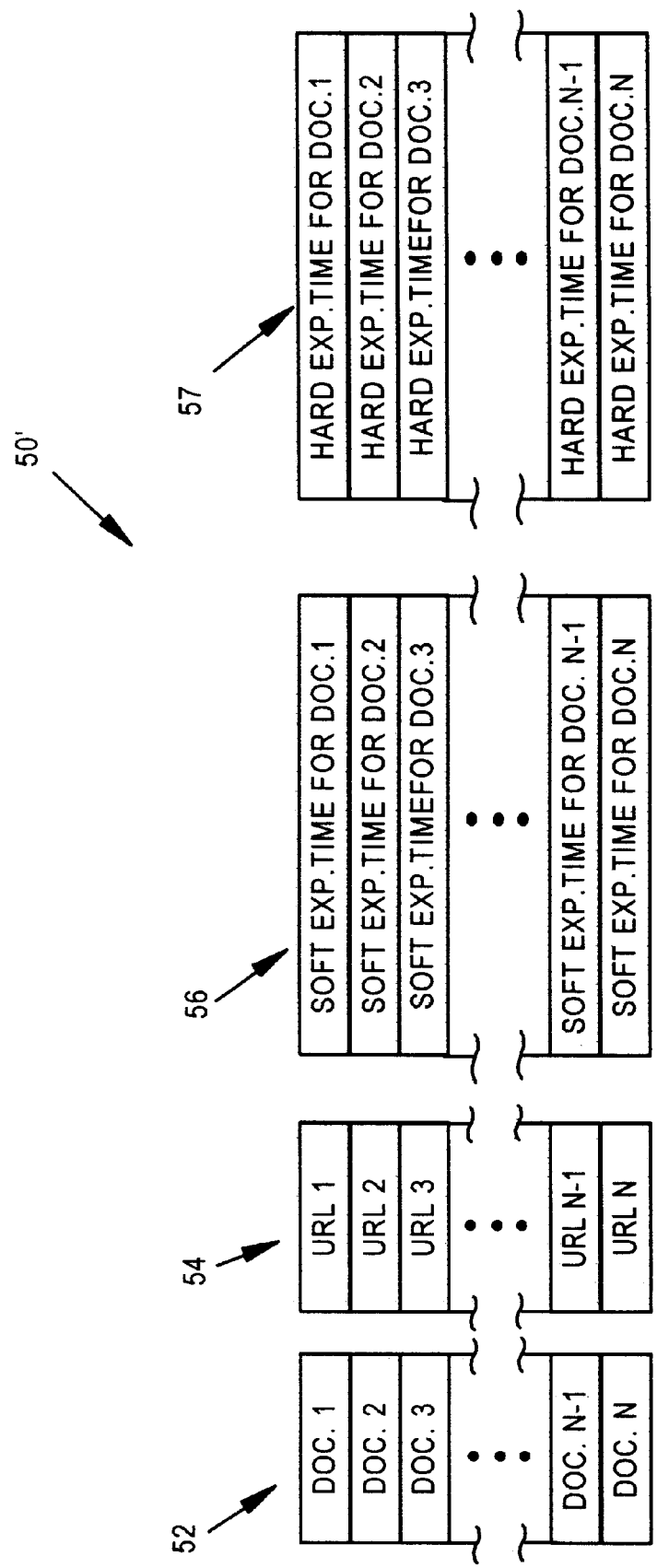
FIG. 5 is a diagram of the functional content of the document cache according to another embodiment of this invention.

FIG. 4 shows the functional organization of the high-level cache 50. The cache 50 includes a plurality of documents 52, a plurality of address identifiers 54 and an expiration time 56. The expiration time refers to a time and date. There is an address identifier 54 for each document 52 stored. In one embodiment the cache 50 store documents located on the internet. The address identifiers for such documents are referred to as uniform resource locators (URLs). The documents 1–N are considered to be up to date before the expiration date and are considered likely to have been modified (e.g., by the document owner elsewhere in the wide area network) after the expiration date. In another embodiment there is a first (e.g., soft) expiration time 56 and a second (e.g., hard) expiration time 57. In a preferred embodiment, as shown in FIG. 5, the cache 50' includes a separate expiration time 56 for each document 52. In still another embodiment (see FIG. 6) the cache 50" includes a soft expiration time 56 and a hard expiration time 57 for each one of the cached documents 52. In some embodiments a respective last modified date 59 also is stored for each document.

The document contents 52, the document address 54, and the document last modified date 59 all are received with the document in the standard protocol for downloading a document from the wide area network. In addition, an expiration date may be available for the document from the network server computer 12 when downloading the document. Often, however, a document owner does not assign an expiration date. In such instance an expiration date field typically is blank when receiving the document and its related information.

When blank, an expiration date is derived for the downloaded document. Typically, the expiration date is derived by taking the difference between the current time (of the download operation) and the last modified date of the document. Then some percentage is added to that amount (e.g., 10–50%). The rationalization is that the older the document is, the longer it is likely to continue to be present on the WAN in an unchanged version. For embodiments in which a respective expiration date is stored in cache for each document, the derived expiration date serves as the expiration date for the document. Where a respective hard and a soft expiration date are stored for each document, then two expiration dates are derived using two percentages. The percentages may be fixed for all documents using a formula with the current time and last modified date being the variables. Alternatively, the percentages also may be variable for the respective documents. For example, certain types of documents may have different percentages than other types of documents. Other intelligent ways also may be implemented for assigning expiration dates.

Figure 6:
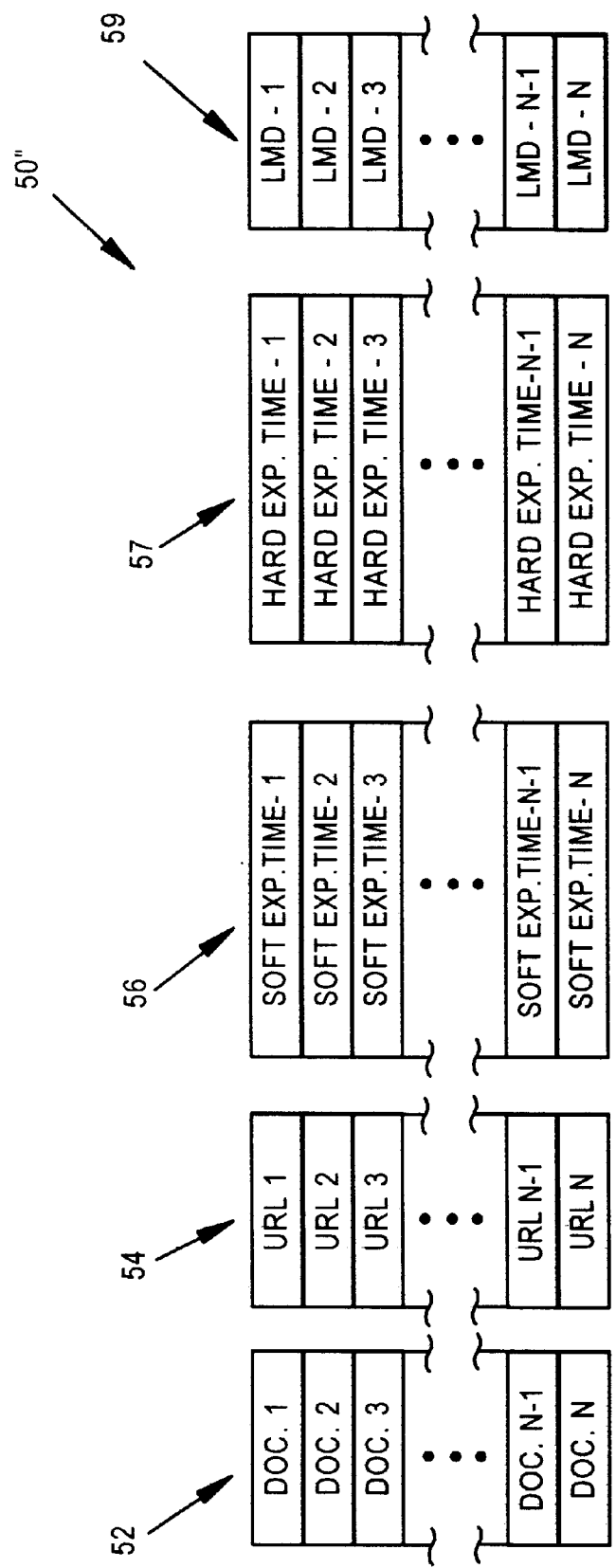
FIG. 6 is a diagram of the functional content of the document cache according to another embodiment of this invention.

In the preferred embodiment, a last modified date, a soft expiration date and a hard expiration date are stored for each respective document as shown in FIG. 6. According to the preferred embodiment the hard expiration date is the date received with the document when downloaded. If absent it is derived. The soft expiration date is derived either from the received expiration date or in a similar manner as the hard expiration date is derived. The soft expiration date expires before the hard expiration date. In one embodiment, the soft expiration date and the hard expiration date also change dynamically based upon their empirical reliability. The method for dynamically altering these expiration dates to improve reliability is described below in one of the embodiment permutations described within the section, Dynamic Updating of Soft and Hard Expiration Times.

The Problem Addressed

The problem addressed by this invention is the prolonged waiting time for documents to be downloaded from the wide area network to the client computer 14 requesting to view a given document. An end user at a client computer 14 will trigger a command to view a specific document located elsewhere in the wide area network 10. Assuming the computer 14 is already connected on-line to the wide area network, the command typically is relayed over the wide area network to the network server computer 12 which owns the document. Such document then is downloaded from such network computer server 12 through the wide area network to the client computer 14. The client computer 14 then formats and displays the document for viewing by the end user. For internet applications, the process may vary somewhat because some documents (e.g., popular documents) may be located on more than one server computer 12. Such multi-location of some internet documents avoids bottlenecks and significant slowing of internet communications.

The time period from when an end user requests that a document be viewed to the time such document is displayed for viewing is referred to herein as latency time. It is desirable to minimize latency time. One of the difficulties in reducing latency time is the limited bandwidth of the requesting computer's network interface. Consider a client computer 14 embodied by the computer system 20 having a modem connection. Conventional modems run at 28.8 kbaud for network access over the conventional public telephone switching system. In special connection situations 56 kbaud connections also may be achieved. It also is known to provide special digital connections using ISDN technology and ISDN modems. These devices achieve transfer rates of 128 kbaud. The vast majority of end users accessing the internet for example, use the 28.8 kbaud modem connection or a slower connection. At such a transfer rate, data rates of approximately 3.3 kilobytes per second are achievable. When viewing multimedia documents or web page documents the latency time can be 10 seconds or higher. When the time to locate and access a host network server computer 12 having the desired document is factored in, the latency time can be 20 seconds or longer. With the growing popularity of the world wide web, latency time is an increasing problem in delivering effective internet access. When latency times get too high, the end users get frustrated and the internet communications get thwarted. Therefore, it is desirable to provide methods for reducing latency time.

According to this invention, the above problem is addressed by locally caching documents from the wide area network onto a hard disk or other storage media at a client computer. Such cache then is accessed by the client computer in lieu of downloading a given document over the wide area network. Such approach is effective as log as the cached documents are up to date. According to aspects of this invention, latency time is reduced by displaying the document before verifying that it is up to date.

Method for Reducing Latency Time—Overview

Latency time as used herein refers to the time period between when a user requests to view a given wide area network document, and a later time that such document is presented for viewing. Initially, an on-line connection is formed between a client computer 14 and the wide area network 10 through a network interface 34. While on-line, the user requests to view various documents. Over time multiple documents 52 are downloaded, viewed and stored in the document cache 50. The corresponding document address (e.g., URL) is stored with the document. In addition an expiration time 56 or times 56, 57 are stored for each document (see cache 50', 50" of FIGS. 5 and 6).

Figure 7:
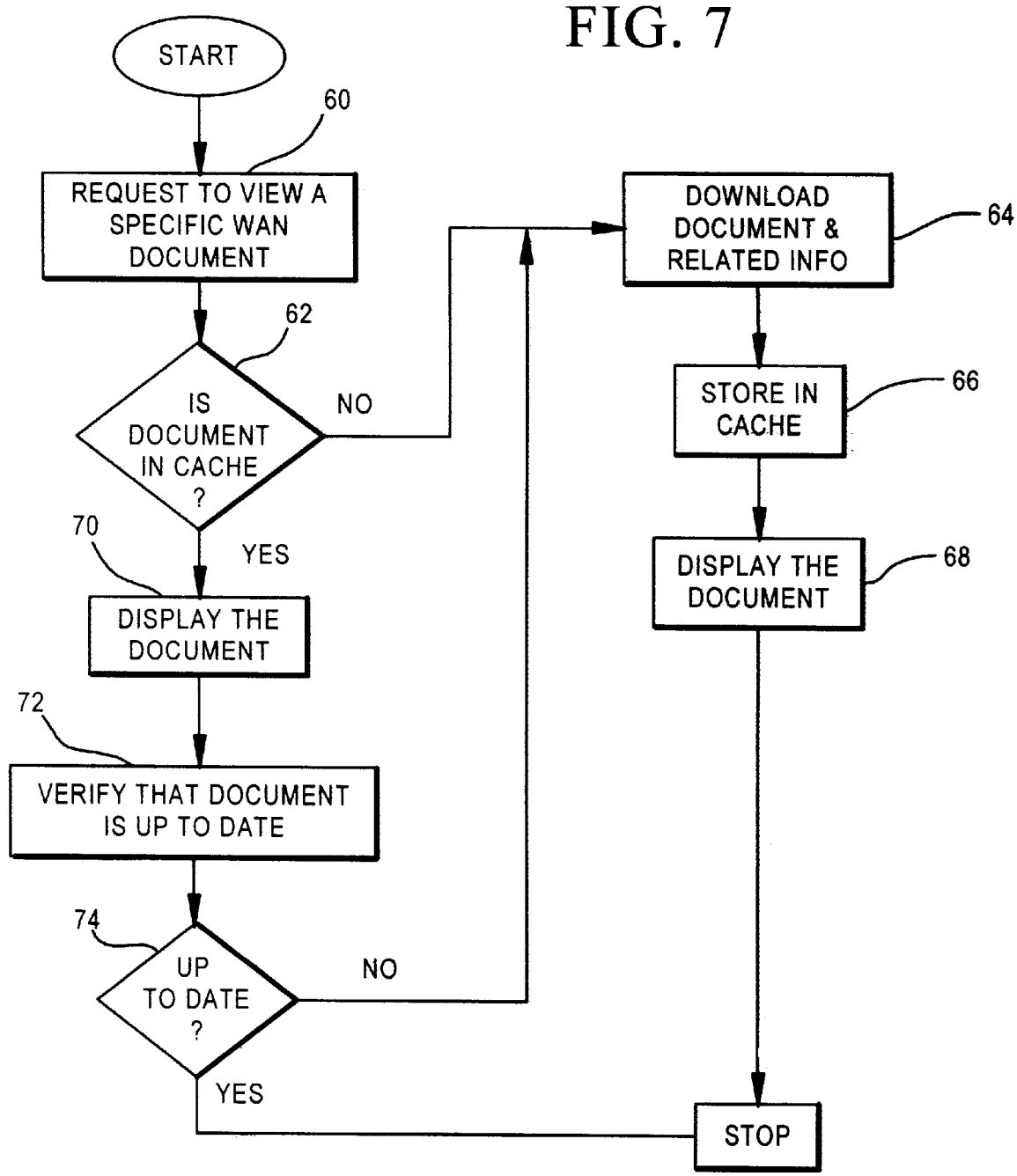
FIG. 7 is a flow chart of a method for reducing latency time according to an embodiment of this invention.

According to the method of this invention, a cached document is displayed upon request prior to verifying its validity. Referring to FIG. 7, a user makes a request at step 60 to view a specific wide area network (WAN) document. At step 62, cache 50/50'/50" is tested to determine whether the requested document is locally stored in the cache. If it is not present, then at step 64, the document and related information (e.g., last modified time ('LMT'); expiration time) is downloaded. The document 52, related information 56–59 (as applicable) and address 54 then are stored at step 66 in the cache 50/50'/50". For an expiration date for a given document, the expiration date, if absent, is derived as previously described. Next, at step 68 the document downloaded is displayed.

If the document, however, is present in cache at step 62, then at step 70 the document is immediately displayed. A verify operation then is performed at step 72. In some embodiments the verify operation includes testing the current time of the client computer clock with the expiration time 56 for the document. In another embodiment, the verify operation includes obtaining information on the document over the wide area network 10. Specifically, a command is sent over the on-line connection from the client computer 14 to a network server computer 12 requesting information pertaining to the specific document as stored on the wide area network. In one embodiment the command is a request of whether the document has expired. In another embodiment the command is a request to receive the expiration date of the document, In another embodiment the command is a request to receive the last modified date of the document.

The requested information is received at the client computer 14 in response to the routed command. A verify test then is performed to determine whether the cached document is up to date. For the command request information on whether the document has expired. The results is tested. For the command requesting the expiration date, the expiration date is compared to the current time or for the embodiment 50' or 50" the stored expiration time for the document. For the command requesting the last modified date, the verify test includes comparing the received last modified date with the last modified date 59 stored for the document. For any of the described embodiments, a result of the verify process indicates whether the cached document is up to date. At step 74 the result is tested. If the document 52 is up to date, then no additional processing is required because the document as cached is already being displayed. If the cached document is not up to date, then it is downloaded at step 64, stored in cache at step 66 along with its related information, and displayed at step 68. In a preferred embodiment, rather than automatically display the document, the user is prompted so the user may decide if they want to see the up to date version of the document. The user may not have much interest in the document and thus may be content with the out of date version (e.g., during their browsing).

Various manners in which the user is prompted include audio and video signals. In one embodiment, a beep is sounded. In another embodiment, a computer generated voice recites a message indicating that the current document is not the most recent edition and that a current version may be viewed by pressing a reload button (e.g., clicking on a reload button icon being displayed). In still another embodiment, a visual text or graphic message is displayed indicating the same information (e.g., in a dialogue window; on the status line). In yet another embodiment audio and visual cues may be combined. In yet another embodiment, the user may configure the interface response to automatically perform the reload with or without an audio or vidual cue. The user also may configure the type of cue in some embodiments.

As described above, a cached document is displayed, then verified. When the verification steps indicate that the document is up to date, tie has been saved by first displaying the document. When the verification process indicates that the document is not up to date, the user still got to see a version of the document more quickly to decide whether they are interested in such document. The user then can decide whether to view the current version of the document, or move on to another task (or continue to view the potentially outdated document).

Case Method for Reducing Latency Time—Soft/Hard Expiration Times

Figure 8:
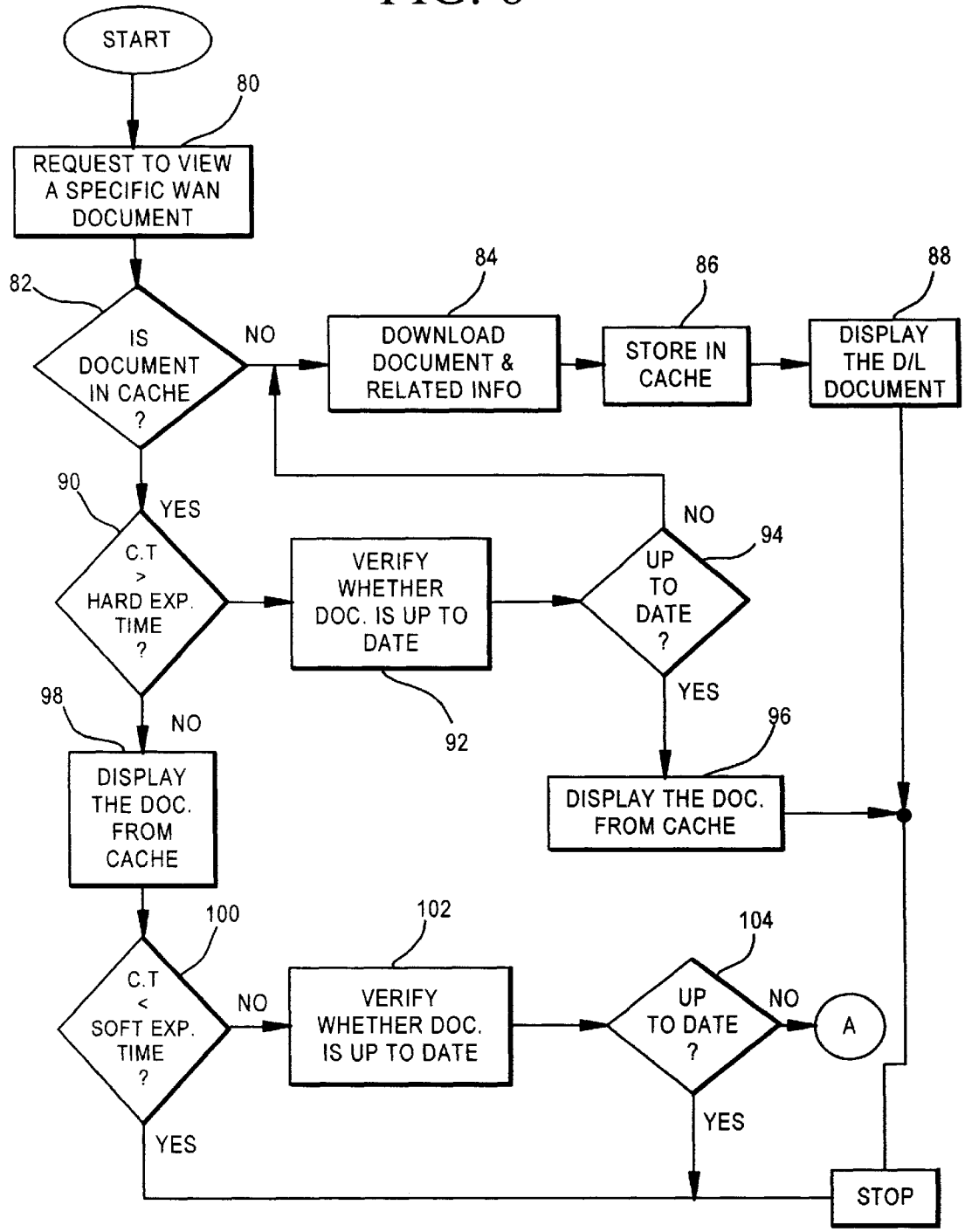
FIG. 8 is a flow chart of a method for reducing latency time according to another embodiment of this invention.

Referring to FIG. 8, a user makes a request at step 80 to view a specific wide area network (WAN) document. At step 82, cache 50/50'/50" is tested to determine whether the requested document is locally stored in the cache. If it is not present, then at step 84, the document and related information (e.g., last modified time ('LMT'); expiration time) is downloaded. The document 52, related information 56–59 (as applicable) and address 54 then are stored at step 86 in the cache 50/50'/50". For a given document, the expiration date, if absent, is derived as previously described. Next, at step 88 the document downloaded is displayed.

If the document, however, is present in cache at step 62, a case approach is executed. A first case is when the current time of the client computer 14 is later than the hard expiration time 57. A second case is when the current time is between the soft expiration time 56 and the hard expiration time 57. The third case is when the current time is less than the soft expiration time 56. (Note that the border conditions (e.g., current time=soft expiration time or hard expiration time) may be handled as if occurring to one side or the other side of the applicable border per the designer's implementation). The case is shown in a decision tree format in the flow chart of FIG. 8.

At step 90, the current time (C.T.) of the client computer 14 is tested to determine whether it is greater than the hard expiration time 57. If greater, then the first case is implemented—verify before display. At step 92 the verify operation is performed as previously described with respect to step 72 of FIG. 7. The results then is tested at step 94 to determine whether the cached version of the requested document is up to date. If not found to be up to date, then the document is downloaded, stored and displayed at described with regard to steps 84–88. If the cached document is found to have been up to date, then the cached document is displayed at step 96.

If the first case is not applicable then, at step 98 the document version stored in cache is displayed. This applies for either of the second or third cases. At step 100, the current time (C.T.) of the client computer 14 is tested to determine whether it is less than the soft expiration time 57. If less, then the third case is being implemented— display, without verify. The cached document is displayed already per step 100, so the case is complete.

If the current time is greater than the soft expiration time (and less than the hard expiration time), then the second case is implemented—display, then verify. The cached version is already displayed per step 98, so a verify operation is performed at step 102. The verify operation is the same as previously described with respect to step 72 of FIG. 7. The verify operation result then is tested at step 104 to determine whether the cached version of the requested document is up to date. If found to be up to date, the cached version is already being displayed so time has been saved.

Figure 9:
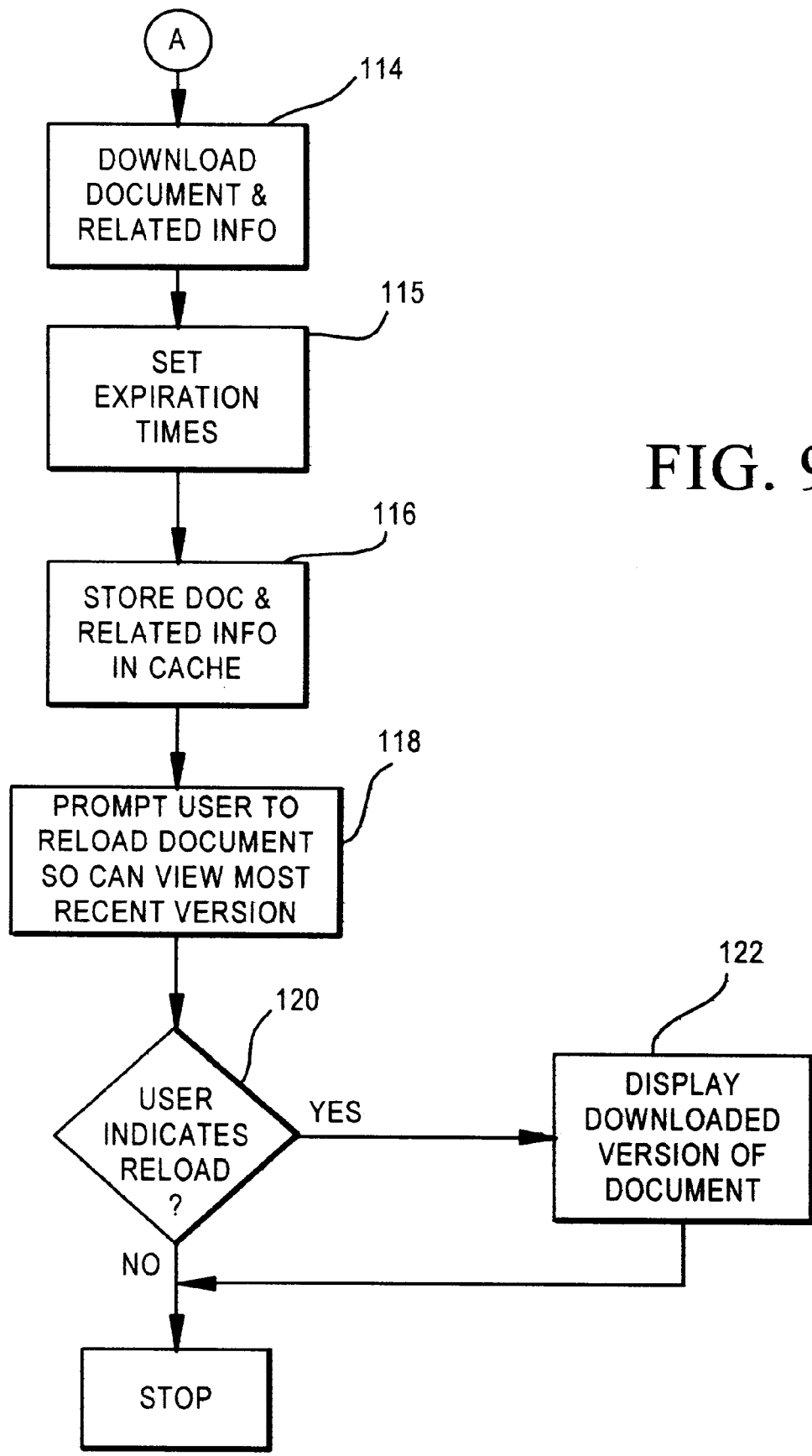
FIG. 9 is a flow chart of an additional branch of processing continued from the flow chart of FIG. 8.

If not found to be up to date, then the document is downloaded at step 114 (see FIG. 9), and stored in cache at step 116 along with its related information, and optionally displayed (at the user's discretion). Expiration times are derived, if applicable, at step 115 as previously described in the section Memory Space . . . . In a preferred embodiment, rather than automatically display the document, the user is prompted at step 118 so the user may decide if they want to see the up to date version of the document. The user may not have much interest in the document and thus may be content with the out of date version (e.g., during their browsing). At step 120 a decision is performed. The downloaded version of the document either is displayed at step 122 if the user requests step 122 is skipped by default. Various manners in which the user is prompted include audio and video signals as previously described.

Dynamic Updating of Soft and Hard Expiration Times

An expiration time for a document is stored each time the document is downloaded. If the document already has an expiration time assigned by the document owner and received with the document when downloaded, then the received expiration time serves as the expiration time for that document (or serves as the hard expiration time when two expiration times are used). If absent, then an expiration time is derived as previously described. A soft expiration time, when applicable also is derived as described above.

In some embodiments the soft expiration time is also changed dynamically even when a new version of the document is not downloaded. Consider case 2 of the method described above regarding FIG. 8. Case 2 refers to the case in which the current time occurs between the soft expiration time and the hard expiration time. According to case 2, the cached version of the document is displayed, then a verify operation is performed after the document is displayed (or while the document is being displayed). If the verify operation results indicate that the cached document is still up to date, then processing time could have been saved if the verify had not even been performed. To make the processing more effective, the soft expiration time is increased to move closer to the hard expiration time. Thus, if the document is requested again the case analysis may fall into case 3 (display without verify) rather than case 2 depending on how soon the document is requested again. According to various embodiments, the soft expiration time is increased by a fixed percentage (e.g., 1–10%) or a variable percentage based upon observed performance of the cache 50/50'/50". The dynamic changing of the soft expiration time occurs along the yes branch of decision step 104.

In some embodiments the hard expiration is dynamically updated. Consider case 1 of the method described above regarding FIG. 8. Case 1 refers to the case in which the current time occurs after the hard expiration time. According to case 1, the cached version of the document is verified to be up to date, before it is displayed. If the verify operation results indicate that the cached document is still up to date, then processing time could have been saved if the verify had not been performed, or at least not performed before the cached version was displayed. To make the processing more effective, when the verify operation 92 indicates that the cached document was up to date at decision step 94, then the hard expiration time is changed in an additional step along the yes branch of decision step 94. Specifically the hard expiration time is increased to be further from the soft expiration time. Thus, if the document is requested again the case analysis may fall into case 2 (display, then verify) rather than case 1 depending on how soon the document is requested again. According to various embodiments, the hard expiration time is increased by a fixed percentage (e.g., 1–10%), or a variable percentage based, for example, upon observed performance of the cache 50/50'/50".

Figure 10:
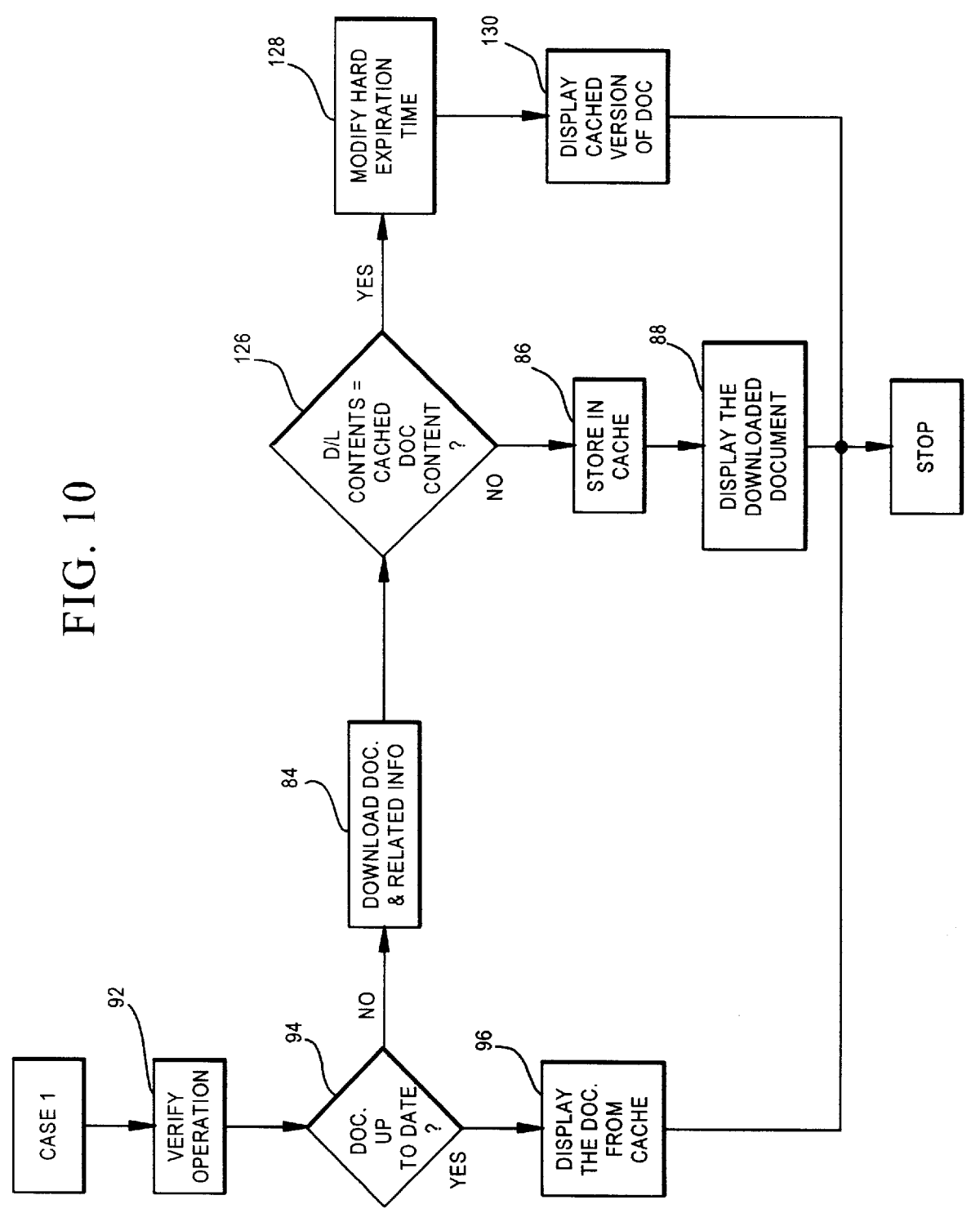

In still another embodiment, the verify operation of steps 92–94 is evaluated for reliability. As described above, a document may have its last modified date updated, even though the contents have not changed. This occurs when an owner of a web site, for example, makes a change to one or more pages of a web site, then uploads all the pages to a network server computer 12. In such case, unless specifically indicated by the owner, all the uploaded pages receive the more recent last modified date. FIG. 10 shows steps for the 'no' branch of the FIG. 8 step 94 according to an alternative embodiment. Thus, case 1 is implemented in which the current time is greater than the hard expiration time. In addition, the verify operation 92 indicates that the document is not up to date. At step 84, a copy of the document is downloaded from the wide area network. At step 126, the contents of the downloaded copy are compared to the cached version. If the contents vary, then processing continues as per the earlier embodiment (i.e., store document and info in cache at step 86, display the downloaded document at step 88). If the contents are the same, however, then the verify operation 92 was unreliable. At step 128, the hard expiration time 57 of the cached version is increased and stored in the cache. According to various embodiments, the hard expiration time is increased by a fixed percentage (e.g., 1–10%), or a variable percentage based, for example, upon observed performance of the cache 50/50'/50". At step 130, the cached version (or the downloaded version) is displayed.

In another embodiment the expiration dates are changed as follows:

If current time is later than soft expiration date
Then $$\text{soft expiration date}=\text{current time}+(\text{current time}-\text{last modified date})/x$$

If soft expiration date is later than hard expiration date
Then $$\text{hard expiration date}=\text{soft expiration date}+(\text{soft expiration date}-\text{last modified date})/x$$

where x is a constant (e.g., 2 or some other integer).

In some embodiments the various steps for the methods described above may be distributed among multiple computers. For example, in some embodiments the step of displaying the document may occur at a different computer than the computer which accesses the cache and performs the verify operation on documents.

Meritorious and Advantageous Effects

According to one advantage of the invention, the average latency time from the time an end user issues a command to display a specific document to the time that such document is displayed is reduced using a display, then verify mode. In addition, the reliability of display then verify is increased by implementing dynamic soft and hard expiration timesfor each cached document.

Although a preferred embodiment of the invention has been illustrated and described, various alternatives, modifications and equivalents may be used. For example, although the verify is described as occurring after a cached document is displayed for some embodiments, such verify may be performed concurrently as the cache version is being displayed. Therefore, the foregoing description should not be taken as limiting the scope of the inventions which are defined by the appended claims.

What is claimed is:

1. A method for reducing latency time for viewing documents stored in a wide area network of network server computers, in which latency time is from a time at which a request to view a given document is made until a later time that such document is presented for viewing, the method comprising the steps of:

forming an on-line connection between a first computer and the wide area network;

storing on a storage media of the first computer (i) a plurality of documents from the wide area network, (ii) corresponding wide area network address identifications for said documents, (iii) a first time, and (iv) a second time, wherein the second time is later than the first time;

requesting display of a specific document of the plurality of documents;

comparing a current time with the first time and the second time;

when the current time is earlier than the second time, displaying the specific document as stored on the first computer;

when the current time is later than the first time, verifying whether the specific document as stored on the first computer is up to date; and downloading a copy of the specific document from the wide area network when the specific document being verified is not up to date;

wherein the specific document (i) is displayed without verification when the current time is earlier than the first time, (ii) is displayed before verification when the current time is between the first time and the second time, and (iii) is verified before a displaying of the specific document when the current time is later than the second time.

2. The method of claim 1, further comprising the step of displaying the downloaded copy of the specific document.

3. The method of claim 2, further comprising, prior to the step of displaying the downloaded copy of the specific document, the steps of indicating to a user of the first computer that the document being displayed is to be reloaded, and receiving a command from the user to reload the document being displayed.

4. The method of claim 3, in which the step of indicating comprises outputting an audio signal.

5. The method of claim 3, in which the step of indicating comprises outputting a visual signal.

6. The method of claim 2, in which the step of displaying the downloaded copy of the specific document occurs automatically when the specific document being displayed is determined not to be up to date.

7. The method of claim 1, in which the step of verifying comprises:
sending a command from the first computer to obtain first data pertaining to the specific document as stored on the wide area network, wherein said command is routed over the on-line connection to the wide area network;
receiving said first data in response to the routed command; and
determining whether the specific document being displayed is up-to-date based upon the first time and the first data.

8. The method of claim 1, wherein the first time is a first expiration time for the validity of the plurality of documents, and the second time is a second expiration time for the validity of the plurality of documents.

9. The method of claim 1, in which the first time is one of a plurality of first times and the second time is one of a plurality of second times, each one of the plurality of first times and each one of the plurality of second times corresponding to a respective one of the plurality of documents stored on the storage media at the first computer.

10. The method of claim 9, wherein the one of the plurality of first times which corresponds to a given document is a time stamp purported to indicate when the given document was last modified.

11. The method of claim 9, wherein the one of the plurality of first times which corresponds to a given document is a first expiration time for the given document and the one of the plurality of second times which corresponds to a given document is a second expiration time for the given document.

12. The method of claim 9, in which the step of verifying comprises:
sending a command from the first computer to obtain first data pertaining to the specific document as stored on the wide area network, wherein said command is routed over the on-line connection to the wide area network;
receiving said first data in response to the routed command; and
determining whether the specific document being displayed is up-to-date based upon the first data, the one of the plurality of first times corresponding to the specific document and the one of the plurality of second times corresponding to the specific document.

13. A method for reducing latency time for viewing documents stored in a wide area network of network server computers, in which latency time is from a time at which a request to view a given document is made until a later time that such document is presented for viewing, the method comprising the steps of:

forming an on-line connection between a first computer and the wide area network;
storing on a storage media of the first computer (i) a plurality of documents from the wide area network, (ii) corresponding wide area network address identifications for said documents, (iii) a respective first time for each one of the plurality of documents, and (iv) a respective second time for each one of the plurality of documents, wherein for any given one of the plurality of documents the second time is later than the first time;
requesting display of a specific document of the plurality of documents;
comparing a current time with the first time and the second time for said specific document;
when the current time is earlier than the second time, displaying the specific document as stored on the first computer;
when the current time is later than the first time, verifying whether the specific document as stored on the first computer is up to date;
downloading a copy of the specific document from the wide area network when the specific document being verified is not up to date;
wherein the specific document (i) is displayed without verification when the current time is earlier than the first time, (ii) is displayed before verification when the current time is between the first time and the second time, and (iii) is verified before a displaying of the specific document when the current time is later than the second time;
wherein the step of verifying comprises:
 (a) sending a command from the first computer to obtain first data pertaining to the specific document as stored on the wide area network, wherein said command is routed over the on-line connection to the wide area network;
 (b) receiving said first data in response to the routed command; and
 (c) determining whether the specific document being displayed is up-to-date based upon the first time and the first data.

14. The method of claim 13, further comprising the step of changing the first time for the specific document to a later time less than the second time for the specific document when the current time is between the first time and the second time and the step of determining indicates that the specific document is up to date.

15. The method of claim 13, further comprising the step of changing the second time for the specific document to a later time when the current time is later than the second time and the step of verifying indicates that the specific document is up to date.

16. The method of claim 15, wherein when the current time is later than the second time and the step of determining indicates that the specific document is not up to date, the step of verifying further comprises, the steps of:
comparing the downloaded copy of the specific document to the stored copy of the specific document;
when the downloaded copy is the same as the stored copy of the specific document, overriding the indication that the specific document is not up to date to indicate that the document is up to date.

17. The method of claim 16, further comprising the step of changing the second time for the specific document to a later time when the current time is later than the second time and the step of verifying indicates that the specific document is up to date.

18. The method of claim 13, further comprising the step of displaying the downloaded copy of the specific document.

19. The method of claim 18, further comprising, prior to the step of displaying the downloaded copy of the specific document, the steps of indicating to a user of the first computer that the document being displayed is to be reloaded, and receiving a command from the user to reload the document being displayed.

20. The method of claim 19, in which the step of indicating comprises outputting an audio signal.

21. The method of claim 19, in which the step of indicating comprises outputting a visual signal.

22. The computer system of claim 21, in which the first time is one of a plurality of first times, each one of the plurality of first times corresponding to a respective one of the plurality of documents stored on the storage media.

23. The computer system of claim 22, in which the first time corresponding to a given document is a time stamp purported to indicate when the given document was last modified.

24. The computer system of claim 22, wherein the first time corresponding to a given document is an expiration time for the given document.

25. The computer system of claim 21, wherein the first time is an expiration time for the validity of the plurality of documents stored on the storage media.

26. The method of claim 18, in which the step of displaying the downloaded copy of the specific document occurs automatically when the specific document being displayed is determined not to be up to date.

27. The method of claim 13, wherein the one of the plurality of first times which corresponds to a given document a first expiration time for the given document and the one of the plurality of second times which corresponds to a given document is a second expiration time for the given document.

28. A computer system for communicating with a wide area network, the wide area network storing a plurality of documents retrievable by the computer system, the computer system comprising:
- a storage media storing (i) a plurality of wide area network documents, (ii) corresponding wide area network address identifications for said plurality of wide area network documents, (iii) a first time and (iv) a second time, wherein the second time is later than the first time;
- means for forming an on-line connection with the wide area network;
- means for a user to request display of a specific document of the plurality of wide area network documents;
- display means which displays the specific document as stored on the storage media;
- processing means for generating a command to obtain first data pertaining to a specific document stored in the wide area network to be displayed, wherein said command is routed over the on-line connection to the wide area network, and in response the first data is returned;
- processing means for determining whether the specific document as stored in the storage media is up to date based upon the first time and the first data;
- processing means for testing a current time against the first time and the second time to determine a sequence of operations, wherein (i) when the current time is between the first time and the second time, the specific document as stored on the first computer is displayed before a determination of whether the specific document stored on the storage media is up to date occurs; and (ii) when the current time is later than the second time the determination of whether the specific document stored on the storage media is up to date occurs before the specific document is displayed; and
- means for downloading a copy of the specific document from the wide area network when the specific document being displayed is not up to date.

29. The computer system of claim 28, further comprising:
- means for indicating to a user of the computer system that the document being displayed is to be reloaded; and
- means for reloading the specific document in response to a user indication to reload, wherein the downloaded copy of the specific document is displayed during reloading.

30. The computer system of claim 29, in which the indicating means comprises means for outputting an audio signal.

31. The computer system of claim 29, in which the indicating means comprises means for outputting a visual signal.

32. The computer system of claim 28, in which the first time is one of a plurality of first times and the second time is one of a plurality of second times, each one of the plurality of first times and a corresponding one of the plurality of second times corresponding to a respective one of the plurality of documents stored on the storage media.

33. A computer system for communicating with a wide area network, the wide area network storing a plurality of documents retrievable by the computer system, the computer system comprising:
- a storage media storing (i) a plurality of wide area network documents, (ii) corresponding wide area network address identifications for said plurality of wide area network documents, (iii) a respective first time for each one of the plurality of documents, and (iv) a respective second time for each one of the plurality of documents, wherein for any given one of the plurality of documents the second time is later than the first time;
- means for forming an on-line connection with the wide area network;
- means for a user to request display of a specific document of the plurality of wide area network documents;
- display means which displays the specific document as stored on the storage media;
- processing means for generating a command to obtain first data pertaining to a specific document stored in the wide area network to be displayed, wherein said command is routed over the on-line connection to the wide area network, and in response the first data is returned;
- processing means for determining whether the specific document as stored in the storage media is up to date based upon the first time and second time for said specific document and the returned first data;
- processing means for testing a current time against the first time and the second time of the specific document to determine a sequence of operations, wherein (i) when the current time is between the first time and the second time, the specific document as stored on the first computer is displayed before a determination of whether the specific document stored on the storage media is up to date occurs; and (ii) when the current time is later than the second time the determination of whether the specific document stored on the storage media is up to date occurs before the specific document is displayed; and means for downloading a copy of the specific document from the wide area network when the specific document being displayed is not up to date.

34. The computer system of claim 33, further comprising means for changing the first time for the specific document to a later time less than the second time for the specific document when the current time is between the first time and the second time and the processing means determines that the specific document is up to date.

35. The computer system of claim 33, further comprising means for changing the second time for the specific document to a later time when the current time is later than the second time and the processing means determines that the specific document is up to date.

36. The computer system of claim 33 further comprising:
means for comparing the downloaded copy of the specific document to the stored copy of the specific document when the current time is later than the second time and the processing means indicates that the specific document is not up to date; and
means for overriding the indication that the specific document is not up to date to indicate that the specific document is up to date when the downloaded copy is the same as the stored copy of the specific document; and
means for changing the second time for the specific document to a later time when the current time is later than the second time and the comparing means indicates that the downloaded copy of the specific document is the same as the stored copy of the specific document.

37. The computer system of claim 33, further comprising:

means for indicating to a user of the computer system that the document being displayed is to be reloaded; and means for reloading the specific document in response to a user indication to reload, wherein the downloaded copy of the specific document is displayed during reloading.

38. The computer system of claim 37, in which the indicating means comprises means for outputting an audio signal.

39. The computer system of claim 37, in which the indicating means comprises means for outputting a visual signal.

* * * * *